United States Patent
Joyce et al.

(10) Patent No.: US 7,406,515 B1
(45) Date of Patent: Jul. 29, 2008

(54) SYSTEM AND METHOD FOR AUTOMATED AND CUSTOMIZABLE AGENT AVAILABILITY AND TASK ASSIGNMENT MANAGEMENT

(75) Inventors: Robert H. Joyce, San Jose, CA (US); Munisekaran Madhipatla, Santa Clara, CA (US); Allan Michael Moore, North Vancouver (CA); Rick A. Perotti, Morgan Hill, CA (US)

(73) Assignee: Aspect Communications, San Jose, CA (US)

( * ) Notice: Subject to any disclaimer, the term of this patent is extended or adjusted under 35 U.S.C. 154(b) by 503 days.

(21) Appl. No.: 09/604,199

(22) Filed: Jun. 27, 2000

(51) Int. Cl.
*G06F 15/173* (2006.01)

(52) U.S. Cl. ............... 709/224; 709/202; 709/223; 379/265.01; 379/265.05; 379/265.09; 379/265.12

(58) Field of Classification Search ............. 709/203, 709/206, 217, 223–224; 379/265.07, 265.09, 379/265.11, 265.12, 265.13, 265, 265.01
See application file for complete search history.

(56) References Cited

U.S. PATENT DOCUMENTS

| | | | | |
|---|---|---|---|---|
| 5,301,320 A | * | 4/1994 | McAtee et al. ............. 705/9 |
| 5,311,574 A | * | 5/1994 | Livanos ............. 379/209.01 |
| 5,546,455 A | * | 8/1996 | Joyce et al. ............ 379/265.03 |
| 5,621,789 A | * | 4/1997 | McCalmont et al. ... 379/265.06 |
| 5,623,541 A | * | 4/1997 | Boyle et al. ............ 379/221.15 |
| 5,664,129 A | * | 9/1997 | Futatsugi et al. ............ 345/763 |
| 5,734,837 A | * | 3/1998 | Flores et al. ............. 705/7 |
| 5,799,297 A | * | 8/1998 | Goodridge et al. ............ 707/1 |
| 5,848,393 A | * | 12/1998 | Goodridge et al. ............ 705/8 |
| 5,903,641 A | * | 5/1999 | Tonisson ............. 379/265.12 |
| 5,905,493 A | * | 5/1999 | Belzer et al. ............. 345/835 |
| 5,918,226 A | * | 6/1999 | Tarumi et al. ............. 707/10 |
| 5,926,539 A | * | 7/1999 | Shtivelman ............ 379/266.01 |
| 6,128,380 A | * | 10/2000 | Shaffer et al. ........... 379/265.01 |
| 6,173,052 B1 | * | 1/2001 | Brady ............... 379/265.01 |
| 6,278,777 B1 | * | 8/2001 | Morley et al. ........... 379/265.02 |
| 6,282,282 B1 | * | 8/2001 | Wineberg et al. ....... 379/265.02 |
| 6,282,283 B1 | * | 8/2001 | Wineberg et al. ....... 379/265.02 |
| 6,366,575 B1 | * | 4/2002 | Barkan et al. ............ 370/352 |
| 6,389,132 B1 | * | 5/2002 | Price ................ 379/265.01 |

(Continued)

OTHER PUBLICATIONS

Switching Applications/Local Services: Packaging Digital Centrex with CTI, Feb. 3, 2000, 1 page, http://www.lucent-sas.com/switching/softapps/local/cti.shtml.*

(Continued)

*Primary Examiner*—Lashonda T Jacobs
(74) *Attorney, Agent, or Firm*—Welsh & Katz, Ltd.

(57) ABSTRACT

A system and method for blending tasks received from a plurality of media switches. The method comprises receiving a plurality of task data indicating a plurality of tasks and a plurality of agent data indicating a plurality of agents. The task data and the agent data are stored in a database system. Tasks are assigned to the agents according to workflows. The system comprises a blending engine coupled to a plurality of media switches and a plurality of agent workstations coupled to the blending engine. The blending engine receives a plurality of task data from the media switches. The agent workstations provide a plurality of agent data to the blending engine. The blending engine provides a plurality of task assignments to the agent workstations according to workflows.

50 Claims, 6 Drawing Sheets

U.S. PATENT DOCUMENTS

| | | | |
|---|---|---|---|
| 6,442,592 B1 * | 8/2002 | Alumbaugh et al. | 709/206 |
| 6,493,695 B1 * | 12/2002 | Pickering et al. | 706/47 |
| 6,539,419 B2 * | 3/2003 | Beck et al. | 709/204 |
| 6,600,822 B2 * | 7/2003 | Kamen | 379/266.07 |
| 6,681,010 B1 * | 1/2004 | Anderson et al. | 379/265.11 |
| 6,771,764 B1 * | 8/2004 | Dezonno | 379/265.02 |
| 6,775,378 B1 * | 8/2004 | Villena et al. | 379/266.07 |

OTHER PUBLICATIONS

Aspect Communications Adds Affordable, Full Function ACD for Small to Medium Customer Contact Centers and Regional Offices, Aug. 23, 1999, 3 pages, http://aspect.com/news/PR_99/pr082399b.htm.*

Aspect Customer Relationship Portal, 1999, 4 pages.*

The Aspect customer Relationship Portal, Feb. 3, 2000, 1 page, http://www.aspect.com/products/portal.com.*

Aspect Customer Relationship Portal, CTI Spotlight, vol. 4, No. 11, Nov. 1999, 2 pages, http://www.aspect.com/news/choice_award/995983.htm.*

Extensible Markup Language (XML) 1.0, WC3 Recommendation, Feb. 10, 1998, 18 pages, http://www.w3.org/Tr/REC-xml.*

Jay Greenspan, webmonkey/authoring/Introduction to XML, Feb. 3, 2000, 1994-2000 Wired Digital, Inc., 10 pages, http://hotwired.lycos.com/webmonkey/templates/print_template.htmlt?meta=/webmonkey/98/41/.*

* cited by examiner

SYSTEM AND METHOD FOR AUTOMATED AND CUSTOMIZABLE AGENT AVAILABILITY AND TASK ASSIGNMENT MANAGEMENT

BACKGROUND

1. Field of the Invention

The invention relates to the field of customer service and the handling and processing of customer service requests. More specifically, the invention relates to handling and processing customer service requests received over a plurality of heterogeneous media.

2. Background

Customer service is an important part of any business. Many companies provide customer service via call centers in which incoming customer telephone calls are received and answered by customer service agents. Typically, each call center is staffed by agents with various skills. Calls are routed to an agent having an appropriate level of expertise for handling the particular kind of call. For example, an agent may have a language skill such as fluency in Spanish (in addition to English) or have expert knowledge of a particular product line.

As the internet has expanded, many companies are taking advantage of this communications medium to provide added methods of customer service. Many companies receive customer requests and comments sent by email either directly or through a web site. Such companies employ customer service agents to respond to these email messages. Responses may be in the form of an email reply or a telephone call.

In addition, the internet provides the ability to interactively service customers while the customer is accessing the company's web site. Such interactive customer service may take the form of interactive text, sometimes known as chat, or interactive voice over the internet. In the interactive voice scenario, a customer speaks into a microphone attached to the customer's computer while viewing the company's web site. The company must also employ persons to handle such internet text and internet voice customer service requests.

BRIEF SUMMARY OF THE INVENTION

A system and method for blending tasks received from a plurality of media switches. The method comprises receiving a plurality of task data indicating a plurality of tasks and a plurality of agent data indicating a plurality of agents. The task data and the agent data are stored in a database system. Tasks are assigned to the agents according to workflows. The system comprises a blending engine coupled to a plurality of media switches and a plurality of agent workstations coupled to the blending engine. The blending engine receives a plurality of task data from the media switches. The agent workstations provide a plurality of agent data to the blending engine. The blending engine provides a plurality of task assignments to the agent workstations according to workflows.

DETAILED DESCRIPTION

A. Overview

The invention provides a system and method for handling and processing customer service requests received over a plurality of heterogeneous media. Customer service requests are referred to herein as tasks. Generally, the invention provides a system and method for blending tasks received from a variety of media. In one embodiment, the system and method of this invention provide for the blending of tasks for agents within a customer relationship center. These tasks may be voice calls, email notes, web interactions and any other interaction that can be handled electronically. In one embodiment, the blending method makes task routing decisions based on the contact center's workload across all media. While individual systems handle the specific media items, the blending method provides a single point of reference for work allocation decisions.

B. A Blending System

Figure 1:
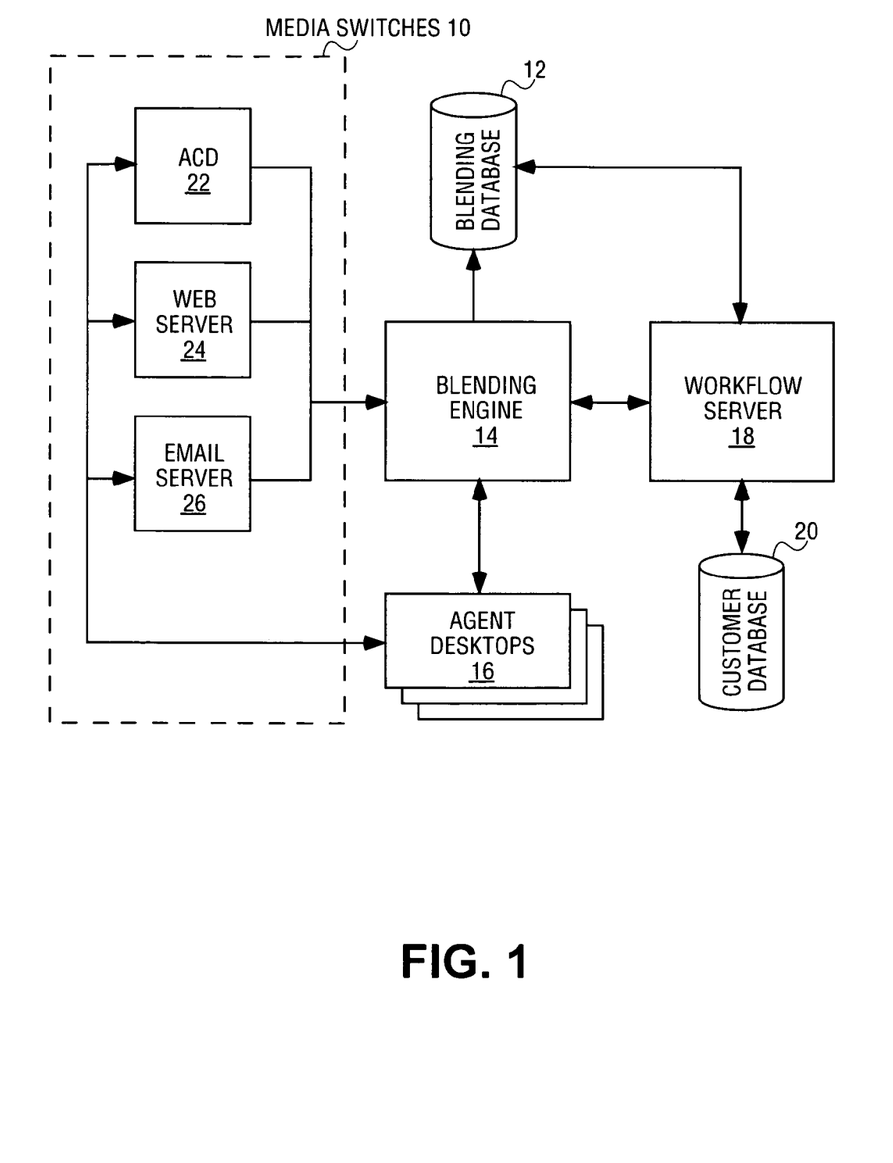
FIG. 1 illustrates a high-level schematic of the architecture of a blending system.

FIG. 1 shows a high-level schematic of the architecture of a blending system. In one embodiment, the blending system includes media switches 10, a blending database 12, a blending engine 14, agent desktops 16, a workflow server 18, and a customer database 20. The media switches include, but are not limited to, an automatic call distributor (ACD) 22, a web server 24 and an email server 26. Agent desktops may be, in one embodiment, computers such as desktop computers or, in another embodiment, networked terminals, and may, in either embodiment, be paired with a telephone or a phone implemented through software.

Figure 2:
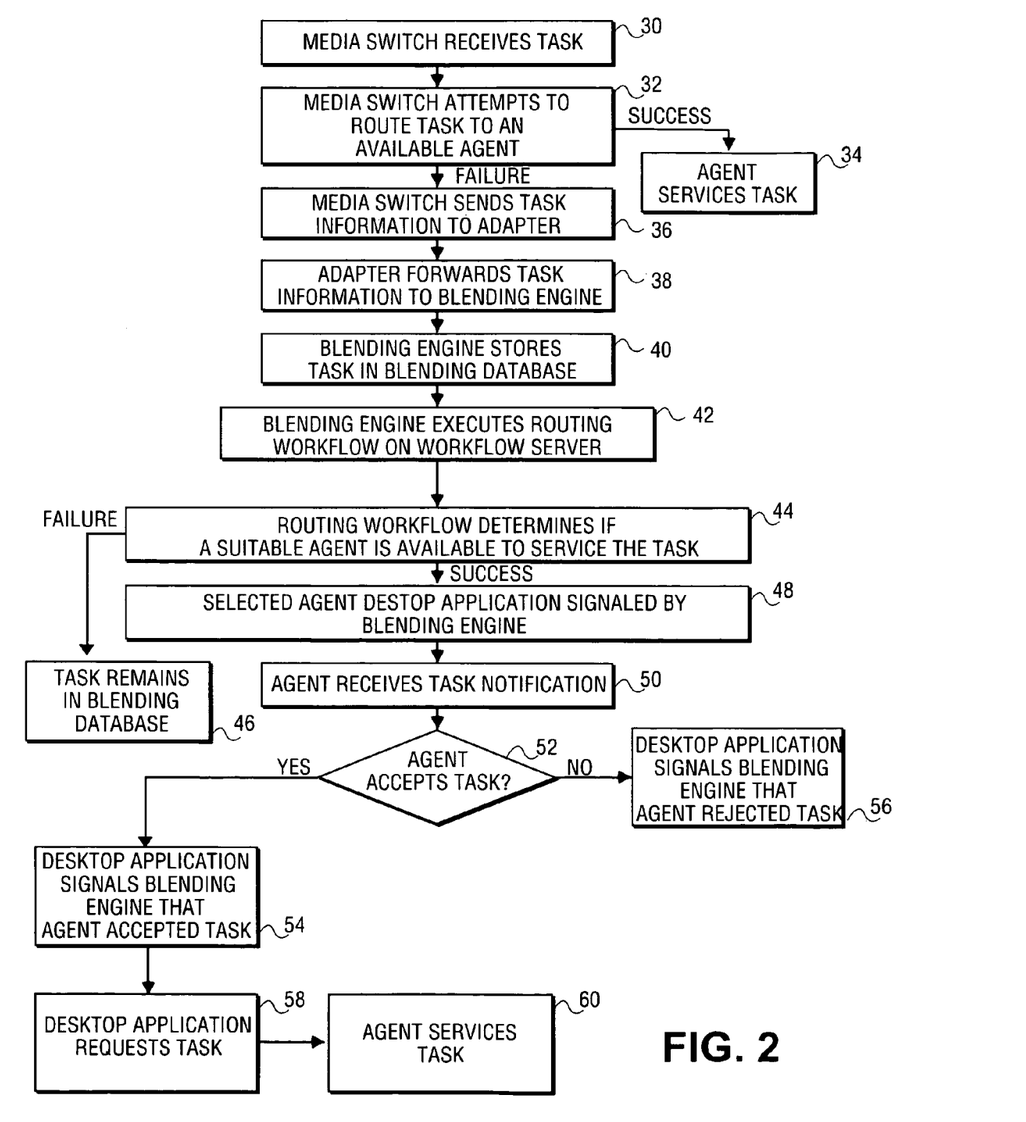
FIG. 2 illustrates the flow of actions taken by a blending system upon receiving an incoming task.

FIG. 2 shows the flow of actions taken by a blending system upon receiving an incoming task. A task is a customer contact item such as a voice call, email message, or web-collaboration request such as text chat or internet interactive voice. Tasks are received by a media switch dedicated to handling contacts in that particular medium. After a task is received by a media switch, as shown in block 30, the media switch attempts to route that task to an available agent, as shown in block 32. If the media switch succeeds in finding an available agent, the agent, known as a non-blended agent, services the task, as shown in block 34. If the media switch cannot successfully assign the task, it sends task information to an adapter as shown in block 36, and the adapter forwards the task information to the blending engine, as shown in block 38. The blending engine stores the task in the blending database, as shown in block 40, and executes a routing workflow in the workflow server, as shown in block 42.

The routing or "task queued" workflow executes business rules to determine whether a suitable agent is available to service the task, as shown in block 44. This decision may be based on information contained in a customer database as well as information in the blending database. In one embodiment, the business rules used to determine assignment and routing are built as part of the deployment of the system and are customizable. In one embodiment, these rules may, for example, involve finding the last agent that spoke to a particular customer and attempting to route the call to that agent. If that agent is unavailable, the skills of available agents could be assessed to establish which agent possesses the skills that most closely match the needed profile. The ethos of the blending system is to evaluate the current situation, and deliver to an agent the most appropriate task at that time. When a task is completed, the status of the system is re-evaluated and an "agent available" workflow is executed to determine which task is now most appropriate to assign to the available agent. In one embodiment, the blending database holds all the tasks across all the media, and, in this way, takes a "whole world" view of the workload of the system. In contrast, media switches only make decisions about their particular medium in isolation of the rest of the system.

The decision of whether there is an agent available is passed to the blending engine from the workflow server. If no suitable agent is available, the task remains in the database as shown in block 46. If an agent is found to handle the task, the blending engine signals the agent's desktop application, which retrieves the task from the media switch, as shown in block 48. The agent receives notification of the task assignment, as shown in block 50, and the blending engine determines whether the agent accepts the task, as shown in block 52. In one embodiment, the desktop application asks the agent to accept the task. In this embodiment, the agent may send a message to the blending engine via the desktop application declining the task. In one embodiment, the blending engine may time out if a task acceptance notification is not received in a specified period of time. If the agent accepts the task, the desktop application signals the blending engine that the agent accepted the task, as shown in block 54. In one embodiment, the blending engine does not respond to the media switch after receiving task data. The desktop application then requests the task from the appropriate media switch on behalf of the agent, as shown in block 58. The agent may then service the task, as shown in block 60. If when the agent receives the task assignment from the blending engine, the agent rejects the task, the desktop application signals the blending engine that the agent rejected the task assignment, as shown in block 56.

In the situation where no available agent is found, the task remains in the database. When an agent via the desktop application signals that the agent is available to take more work, the blending engine causes a workflow to execute.

In one embodiment, an "agent available" workflow uses the agent skill information stored in the blending database to determine the most appropriate task for the agent to take at the time. This decision is passed back to the agent desktop via the blending engine, and the desktop application retrieves the task from the media switch.

In another embodiment, a "check system status" workflow may execute to monitor the status of the entire system. Execution of a "check system status" workflow may be event based or time based. That is, execution may be triggered upon the expiration of a defined period of time, such as, for example, every minute, and upon the occurrence of particular defined events, such as, for example, when a task is queued, or when a defined number of tasks are queued. In one embodiment, agents may have a status of "available if needed." In this embodiment, the "check system status" workflow may call in agents when the system load exceeds a predetermined threshold by transitioning the status to "available" which causes the "agent available" workflow to run. In another embodiment, the "check system status" workflow interrupts agents, requesting that they abandon one task for another that has become more important. This embodiment is particularly effective for re-assigning agents handling email when call volumes suddenly rise. In this embodiment, the blending engine instructs agents to abandon their email tasks and switch to taking calls. In a related embodiment, the agent status may be set to AVAILABLE, UNAVAILABLE, or AVAILABLE IF NEEDED. In such an embodiment, the "check system status" workflow may assign tasks to agents having the status of AVAILABLE IF NEEDED if certain criteria are met. This embodiment is particularly useful if persons with other positions in the company have the skills needed to assist in handling tasks when the volume of tasks exceeds a predetermined threshold.

C. Blending System Architecture

1. Overall Functionality

Figure 3A:
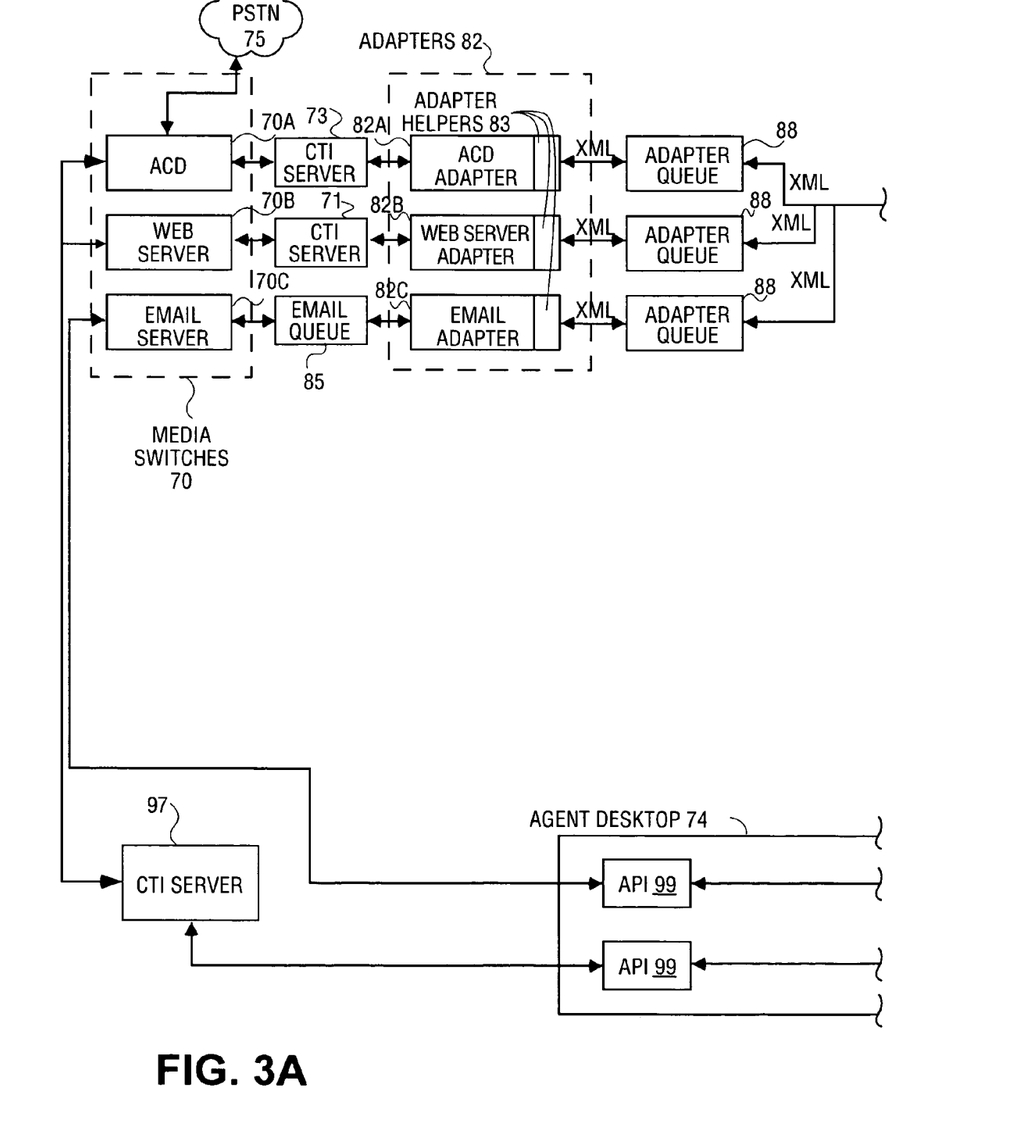
FIGS. 3A and 3B illustrate a more detailed schematic of the architecture of a blending system.
Figure 3B:
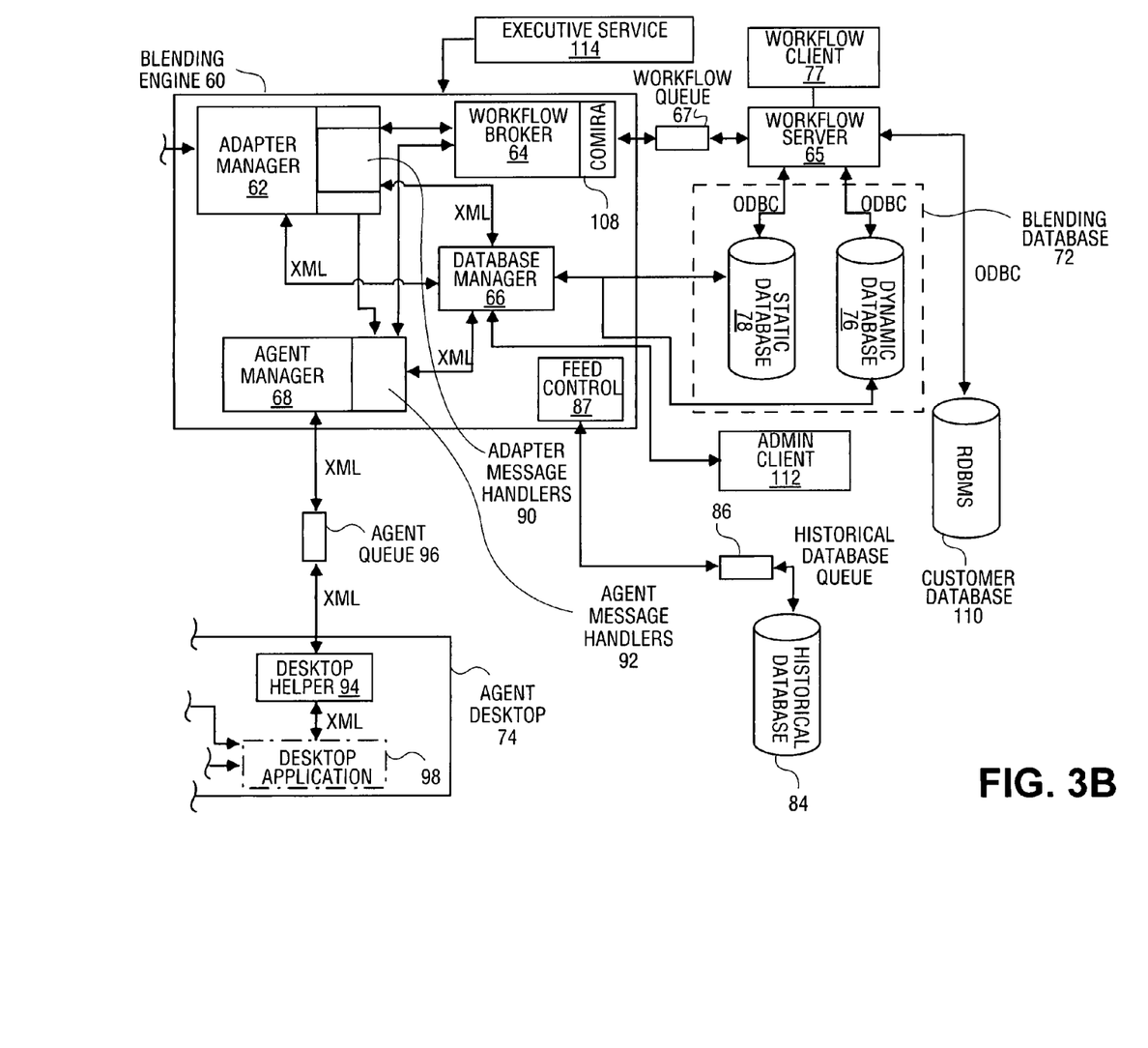

FIGS. 3A and 3B illustrate a more detailed schematic of the architecture of a blending system. (FIGS. 3A and 3B combine to form one larger figure and should be considered together.) Blending engine 60 consists of four components: adapter manager 62, workflow broker 64, database manager 66, and agent manager 68. In one embodiment adapter manager 62 communicates with other components via adapter message handlers 90, and agent manager 68 communicates with other components via agent message handlers 92. More specifically, adapter manager 62 provides common interface connectivity between media switches 70 and blending engine 60. Workflow broker 64 is a conduit for invoking and receiving responses from workflow server 65. Database manager 66 provides connectivity to blending database 72. In one embodiment, the blending database is comprised of dynamic database 76 and a static database 78. Agent manager 68 manages communication between blending engine 60 and agent desktop 74. The media switches 70 communicate with the blending engine via adapters 82 specifically designed for each particular switch. Each adapter 82 places messages received from a particular media switch 70 into a new message in common message format to be forwarded to blending engine 60. The common message format used in one embodiment is extensible markup language, more commonly known as XML, ver. 1.0 (more information is available from the World Wide Web Consortium, Massachusetts Institute of Technology, Laboratory for Computer Science, 545 Technology Square, Cambridge, Mass. 02139). In one embodiment, the interface between adapters 82 and blending engine 60 is provided via adapter queues 88 that allows for asynchronous communication. In one embodiment, adapter queues 88 are implemented as Microsoft Message Queue (MSMQ). More information on MSMQ is available from Microsoft Corporation, Redmond, Wash.

At least three messages are produced by each of adapters 82: task queued, task dequeued, and reset. More specifically, a "task queued" message is sent when a task needs to be assigned to an agent. A "task dequeued" message is sent when a task has been assigned to an agent, whether through blending or independently. In addition, a "task dequeued" message may be sent when the task has been abandoned such as, for example, when a caller hangs up. A "reset" message is sent to clear queues when an adapter is brought up and taken down. Other messages may be produced by adapters, including a "task queued" message.

Adapter manager 62 determines the medium to which the received message is related and passes that message to the corresponding adapter message handler 90. There is a one-to-one correlation between each of adapters 82 and each of adapter message handlers 90. Adapter message handlers 90 extract information from the common message format message, and perform actions relevant to the particular message type. That is, if the message signals that a task has been queued, the appropriate adapter message handler 90 will request database manager 66 to store the task in the relevant virtual queue within dynamic database 76, and will then request workflow broker 64 to initiate a "task queued" workflow. When a response is received from workflow server 65, workflow broker 64 passes the response to an adapter message handler 90.

If an agent has been found to handle the task, adapter message handler 90 informs the agent manager 68 via the agent message handler 92 to pass the task data to the relevant agent desktop 74. Agent manager 68 sends a common format message (in one embodiment, an XML message) to desktop helper 94 via agent queue 96 (in one embodiment, an MSMQ) from which the desktop application 98 determines the medium and any other relevant information (such as call/email ID). Desktop helper 94 provides a communication layer between desktop application 98 and agent manager 68. In a similar way to the adapter helpers 83, desktop helper 94 manages agent queue 96 while the desktop application 98 creates and processes messages to be passed through agent queue 96. In addition, desktop helper 94 creates two messages: "connect" and "disconnect." The messages are passed into desktop helper 94 in a common message format, such as, in one embodiment, XML, and are forwarded to agent manager 68. Desktop application 98 uses the task data to select the correct media switch 70 with which to work and, via the relevant application program interface (API) 99, requests that the task be delivered to that agent. In one embodiment, when the desktop application is executed, connections to each of the media switches for which the agent is qualified are automatically established via the appropriate APIs.

If an agent is not found, the task will remain in the database until such a time as the media switch assigns it to a non-blended agent, or a blended agent becomes available. In the latter scenario, desktop application 98 sends a common format message (in one embodiment, an XML message) to desktop helper 94 to indicate that the agent requires more work. Desktop helper 94 forwards this message to agent manager 68 via agent queue 96, which then passes the request to workflow broker 64 via agent message handler 92. The flow from this point is the same as for task queued.

2. Media Switches

Media switches 70 receive, queue and deliver its associated medium in electronic format. In addition, media switches generate events signaling that a task has been queued, dequeued and, in the case of real-time interactions, disconnected. A media switch provides an interface to enable a desktop application to request and be delivered a task. Some media switches allow for specific tasks to be requested, while other media switches only provide the oldest, or other switch-determined, task. Media switches may be smart or dumb. Examples of media switches 70 include, but are not limited to, ACD 70A (such as those available from Aspect Communications of San Jose, Calif., Lucent Technologies of Murray Hill, New Jersey, and Nortel Networks Corporation, Brampton, Ontario, Canada) email server 70C (such as Aspect's Aspect Customer Email available from Aspect Communications of San Jose, Calif.), and web server 70B (such as Web Interaction available from Aspect Communications of San Jose, Calif.).

ACD 70A provides access to incoming telephone calls from a public switch telephony network (PSTN) 75. Live telephone calls are queued, and information about the calls is then routed to blending engine 60 when a non-blended agent is unavailable to process the incoming call. In another embodiment, voice mail may be stored by ACD 70A and then routed to blending engine 60 for processing.

POP3 mail server 84 may also be a media switch. POP3 is short for Post Office Protocol, Version 3, an internet mail standard promulgated by and available from the Network Working Group of the Internet Engineering Task Force at http://www.ietf.org/rfc/rfc1939.txt. POP3 servers support receiving, queuing and delivering messages in email format. Although, POP3 servers do not have the capability to proactively notify an external system of the queued of an email message, in one embodiment, a POP3 adapter, effectively a wrapper application, is used to provide a simple polling mechanism to check the current state of the POP3 queue, thus giving a POP3 server full media switch capabilities.

In one embodiment, web interaction, text chat and voice over the internet capabilities are provided by web server 70B. Communication between an agent and a customer are provided by any method known to these skilled in the art to establish text chat and voice over internet connections. In such an embodiment, the customer's display may automatically mimic the sequences of internet web pages traversed by the agent. In such an embodiment, agent desktop 74 signals web server 70B via computer telephony integration (CTI) server 97 that a connection has been established, which is in turn picked up by CTI server 71. Web server adapter 82B, coupled to CTI server 71, translates establishment of a web server connection into a "dequeued" message and forwards the message to adapter manager 62 of blending engine 60 via adapter queue 88. Various other implementations are possible and readily known by those skilled in the art.

In another embodiment, each media switch includes a private database for storing configuration data. In one embodiment, whenever a media switch updates its database, the media switch sends a message to the blending database via the adapter manager of the blending engine which then updates the configuration data. In a related embodiment, the blending database may regularly poll the media switch databases for updated or new configuration data. Configuration data may include information such as, for example, a group data specifying to which group an agent belongs.

3. Adapters a. Adapter

The role of the adapter is to provide connectivity to media switches. Each media switch 70 has a differing output in terms of the number of event messages it produces, and the format and content of those messages. To ensure that the blending engine 60 does not have to support multiple types of messages, adapters 82 offers a common set of messages across the whole range of switches. That is, ACD adapter 82A receives ACD specific messages from ACD 70A via CTI server 73 and processes them into common messages in a common message format; web server adapter 82B receives web server specific messages from web server 70B via CTI server 71 and processes them into common messages in a common message format; and email adapter 82C receives email specific messages from email server 70C via email queue 85 and processes them into common messages in a common message format.

In one embodiment, at least three common messages are supported: "task queued", "task dequeued" and "reset". A "task queued" message is sent when a task needs to be assigned to an agent. A "task queued" message causes the blending engine to add the task to the appropriate queue in the blending database and to invoke the "task queued" workflow to determine if an appropriate agent is available to service the task. A "task dequeued" message is sent when a task has been assigned to an agent. A "task dequeued" message causes the blending engine to remove the task from the appropriate queue in the blending database. A "reset" message is sent when an adapter has been brought up or taken down. The "reset" message causes the blending engine to empty the particular adapter queue 88 for the particular media switch.

Although these kinds of messages are common across adapters, in one embodiment, each message is named differently for each adapter so that the messages from different media switches are easily and instantly distinguishable and may be processed by the blending engine based on their name. In addition, even though the same kinds of messages may be used, the content of the same kind of message may vary for each adapter, even if the adapter is of the same type of adapter. For example, a task queued message from an Aspect ACD contain different information and different fields than a task queued message from a Lucent ACD.

In one embodiment, these common kinds of messages are formatted and transferred in a common message format such as XML. This offers the advantage that the blending engine has only one message format to process, while the actual structure and content of the messages is not restricted using a common message format also facilitates support for new and additional switches. Each media switch has different data pertinent to its particular medium. For example, dialed number identification service (DNIS) and automatic number identification (ANI) services that provide the telephone number of a call, are important to a voice telephone call, but are not available or relevant to an email message; whereas email messages have to/from addresses and a subject line not available for voice telephone calls.

Although the internal format of the messages are different for each media switch, in one embodiment, the messages are all sent via XML. The adapter for a media switch takes the information produced by that switch and bundles it into a common message format, in one embodiment, XML message. The messages contain data items expected by the corresponding adapter message handlers 90 for the media switch. The common message format serves effectively as a protocol between the adapters 82 and the adapter message handlers 90. When support for a new media switch is required, a new adapter that produces common messages in the common message format must be created. The following is an example "call queued" message from an ACD adapter in XML format:

```
<?xml version="1.0" ?>
<START>
    <TYPE>
        ASPT_CALL_ARR
    </TYPE>
    <CUSTOM>
        <MEDIA_ID TYPE ="INT">
            5
        </MEDIA_ID>
        <TASK_ID TYPE ="INT">
            1029
        </TASK_ID>
        <APPLICATION_ID TYPE ="INT">
            126
        </APPLICATION_ID>
        <TRACK_NUM TYPE ="INT">
            10529
        </TRACK_NUM>
        <DNIS TYPE="STRING">
            18003254958
        </DNIS>
        <ANI TYPE="STRING">
            4082651093
        </ANI>
        <STATUS TYPE="STRING">
            ARRIVED
        </STATUS>
        <STATUS_CHANGE TYPE="TIMESTAMP">
            1999-07-27 10:23:56.000100
        </STATUS_CHANGE>
```

-continued

```
    </CUSTOM>
</START>
```

Adapter message handler 90 receives and parses this message, interrogates the value of TYPE, and then coordinates the processing required by that type of message. In this example, this includes instructing database manager 66 to add this information to blending database 72. Other messages, such as "call queued", may, in one embodiment, cause workflow broker 64 to send a message via workflow queue 67 to workflow server 65 which causes a workflow to execute.

In another embodiment, a "call queued" or other message may cause adapter message handler 90 to instruct workflow broker 64 to send a "user defined event" to workflow server 65.

In one embodiment, when using XML the order in which the data items (contained in the <CUSTOM> . . . <CUSTOM> tags) are positioned is unimportant. In this embodiment, if a data item is non-mandatory, it does not need to appear at all. That is, the data item does not require a placeholder. The message contains information signaling that an event has occurred creating a task; the message does not contain the actual task itself. This is obvious for voice calls, but not so for email or other text-based media. The messages contain information about the task needed to make decisions about retrieving and processing the task.

b. Adapters and Adapter Helpers

A key role of adapters 82 is to translate native messages from the media switches into a common message format such as, in one embodiment, XML. Although there is a common message format, what is common about the format is the general structure and arrangement of the message. The internal information within each common message format message remains media specific. In one embodiment, the adapters 82 communicate with the adapter manager 62 via the relevant adapter queue 88. Whereas each adapter 82 is specific to each media switch 70, the communication between adapters 82 and the adapter manager 62 is generic. The adapter helpers 83 assist the adapter 82 by establishing a connection to adapter manager 62 on startup, closing the connection on shutdown and managing messages on the adapter queues 88.

4. Blending Engine a. Adapter Manager

Adapter manager 62 acts as the communication hub between adapters 82 and adapter message handlers 90. In one embodiment, when an adapter 82 has a message for the blending engine 60, the adapter places the message in a common message format. In one embodiment, to achieve this, adapter 82 wraps the message in XML and places it in an adapter queue 88. In one embodiment, a mandatory field in the common message format and, in one embodiment, in the XML message, is TYPE. This field allows the adapter manager 62 to determine to which adapter message handler 90 the message should be sent.

b. Adapter Message Handlers

The role of the adapter message handlers 90 is to extract the information sent by an adapter and act upon that information within the blending engine on the adapter's behalf. In one embodiment, there is one adapter message handler for each media switch. The adapter message handlers 90 serve three purposes. The adapter message handlers 90: (1) keep task information in the blending database 72 current; (2) invoke "task queued" workflows; and (3) request agent manager 68 to assign tasks to agents. Messages are passed to the adapter message handlers 90 via adapter manager 62 in blending engine 60. When the adapter message handlers 90 start up, each adapter message handler registers with the adapter manager 62 and specifies which kind of messages it processes. This registration allows for matching those messages produced by the corresponding adapter 82 to the appropriate adapter message handler 90.

c. Workflow Broker

Workflow broker 64 receives common message format messages from the adapter message handlers 90 to process "task queued" events. Workflow broker 64 receives common message format messages from agent message handler 92 to execute "agent available" workflow functionality. The content of these messages determines what event and parameters workflow broker 64 sends to workflow server 65 to cause the correct workflow to execute. In one embodiment, workflow broker 64 communicates with workflow server 65 via workflow queue 67. Communicating through a queue avoids dropped connections at high throughput. In one embodiment, workflow queue 67 is an MSMQ. In this embodiment, workflow broker 64 uses a Component Object Model Intelligent Route Administrator (COMIRA) component 108 to manage this communication. This is based on the Component Object Model (COM) standard popularized by Microsoft Corporation of Redmond, Wash.

d. Database Manager

Database manager 66 provides Open Data Base Connectivity (ODBC) communication between blending engine 60 and blending database 72. ODBC is a standard database access method popularized by Microsoft Corporation of Redmond, Washington. ODBC uses Structured Query Language (SQL) as its database access language. In one embodiment, database manager 66 does not provide access to external databases, such as a customer database 110. In one embodiment, database manager 66 receives common message format messages from adapter message handlers 90 and the agent message handler 92. In some embodiments, these message are formatted as XML messages. In such an embodiment, these messages contain structured data informing database manager 66 which database, object and attributes need to be added to, updated or deleted from blending database 72. For example, a "call queued" message received by the ACD message handler 90 by the adapter manager 62 via an adapter queue 88 is bundled as an XML message and is sent to and informs the database manager 66 how to store that information in blending database 72. In this embodiment, the common message format XML message sent from the message handler to database manager 66 is:

```
<?xml version="1.0" ?>
<START>
    <TYPE>
        ASPT_CALL_ARR
    </TYPE>
    <HEADER>
        <STORAGE>
            DYNAMIC
        </STORAGE>
        <OBJECT>
            T_ASPT_CALL
        </OBJECT>
        <OPERATION>
            ADD
        </OPERATION>
    </HEADER>
    <DATA>
        <T_ASPT_CALL>
            <MEDIA_ID TYPE ="INT">
                5
            </MEDIA_ID>
            <TASK_ID TYPE ="INT">
                1029
            </TASK_ID>
            <APPLICATION_ID TYPE ="INT">
                126
            </APPLICATION_ID>
            <TRACK_NUM TYPE ="INT">
                10529
            </TRACK_NUM>
            <DNIS TYPE="STRING">
                18003254958
            </DNIS>
            <ANI TYPE="STRING">
                4082651093
            </ANI>
            <STATUS TYPE="STRING">
                ARRIVED
            </STATUS>
            <STATUS_CHANGE TYPE="TIMESTAMP">
                1999-07-27 10:23:56.000100
            </STATUS_CHANGE>
        </T_ASPT_CALL>
    </DATA>
</START>
```

This XML message instructs database manager 66 to add data to the T_ASPT_CALL table in dynamic database 76. The data itself is held in the <DATA> . . . </DATA> tag pairing. Database manager 66 parses this data, constructs the correct SQL statement to perform the action, and sends it to dynamic database 76 via ODBC.

e. Agent Manager

At startup, desktop helper 94 communicates with agent manager 68 to specify which queue the agent manager should use to send messages to that particular agent desktop. In one embodiment, the agent's ID is used as part of the queue name. In this way, agent manager 68 is able to distinguish between, and deliver tasks to the appropriate agent queue 96 and thus to the appropriate individual agent desktops 74. Like the communication between adapters 82 and adapter manager 62, there is one queue, agent queue 96, dynamically allocated for sending messages between agent manager 68 and each of the desktop helpers in a plurality of agent desktops (although only one agent queue 96 and one agent desktop 74 with one desktop helper 94 are depicted).

5. Blending Database

Blending database 72 holds configuration information about agents and media switches, and a copy of the queues for all media switches. The blending database is accessed by the various workflows to accomplish task and agent assignments. In one embodiment, the blending database comprises two databases, dynamic database 76 and static database 78. In one embodiment, the dynamic, in-memory database is a SQL database such as the TimesTen™ database system available from TimesTen Performance Software, Inc., 2085 Landings Drive, Mountain View, Calif. 94043. Dynamic database 76 is a real-time in-memory database containing a virtual model of the queues on media switches 70. Blending database 72 also contains configuration information for speed of access. Using a dynamic, in-memory database as part of the blending database allows for fast access to information. In one embodiment, persistent information such as agent and media configuration is stored in static database 78. In one embodiment, static database 78 is a writeable media database such as Oracle8i available from Oracle Corporation, 500 Oracle Parkway, Redwood Shores, California 94065. This static, writeable media database is used in conjunction with the dynamic, in-memory database to prevent data loss when a machine crashes.

Dynamic database 76 is, in one embodiment, an in-memory relational database management system (RDBMS) that is accessible through SQL via ODBC. The dynamic RDBMS has advantages over static RDBMS systems in that optimization algorithms can be more precise since they do not need to account for disk access. In addition, delays incurred while data is accessed from physical disks are eliminated when using a dynamic RDBMS. The dynamic, in-memory RDBMS is, therefore, significantly faster than traditional static RDBMS technologies.

Blending database 72 contains a number of standard entries. These entries may reflect, in various embodiments, multiple skill classifications of agents which are used by the workflows to assign tasks to agents. These entries may be, maintained by an admin client 112 that communicates with blending database 72 via database manager 66. If additional information is required to be stored in blending database 72, this additional information may be added according methods known to those skilled in the art. For example, a "first language" property may be added to media blending agent details. In this way, admin client 112 may be used to maintain blending database 72.

In one embodiment, an historical database is also used. Historical database 84 effectively listens in on what is occurring in the blending engine 60 via feed control 87. In one embodiment, feed control 87 receives information from all components of the blending system. For clarity, input to feed control 87 from adapter manager 62, workflow broker 64, database manager 68, agent manager 68, adapter message handlers 90 and agent message handlers 92 are not depicted. Historical database 84 is coupled to feed control 87 via historical database queue 86. In one embodiment, historical database queue 86 may be an MSMQ. Historical database 84 receives XML formatted messages and may maintain historical information gathered from messages sent within the blending system. The admin client 112 may use the historical information to prepare useful information, such as, for example, how long it takes agents in general to handle particular kinds of tasks, how long it takes agents a particular agent to handle particular kinds of tasks, and which agents worked with particular client companies or particular persons in servicing prior tasks. Such information is useful to a customer service center administrator in developing customer service policies for agents to follow and managing employee agents.

6. Executive Service

The executive service 114 starts up and gracefully shuts down the blending engine components. When the executive service starts up, it enumerates all the managers and helpers, allowing the handlers to register with the managers, and the managers to register with each other.

D. Workflows

Workflows implement various business rules which vary depending on the particular embodiment and implementation. In one embodiment, workflows work to allocate agents and tasks from all media switches. In another embodiment, workflows only allocate tasks received over one kind of media switch. In one embodiment, the business rules invoked by the blending engine handle two scenarios: (1) finding an available agent to deal with an incoming task, processed by the "task queued" workflow; and (2) finding a queued task for an agent becoming available and requesting more work, processed by the "agent available" workflow. The latter is more likely to result in a successful assignment as it is far more common in contact centers for tasks to be queuing, waiting for an agent to become available, than for agents to be waiting for long periods of time for work to arrive. In one embodiment, a "check system status" workflow is also provided to periodically execute and achieve agent assignments or re-assignments when certain system conditions exist, such as if the system volume is beyond a certain predetermined threshold. Workflow client 77 provides access to the blending system such that a system manager may amend existing workflows such as for customization. In addition, the workflow client allows for and provides an extensive system for adding new workflows beyond those discussed herein.

1. Task Queued Workflow

Figure 4:
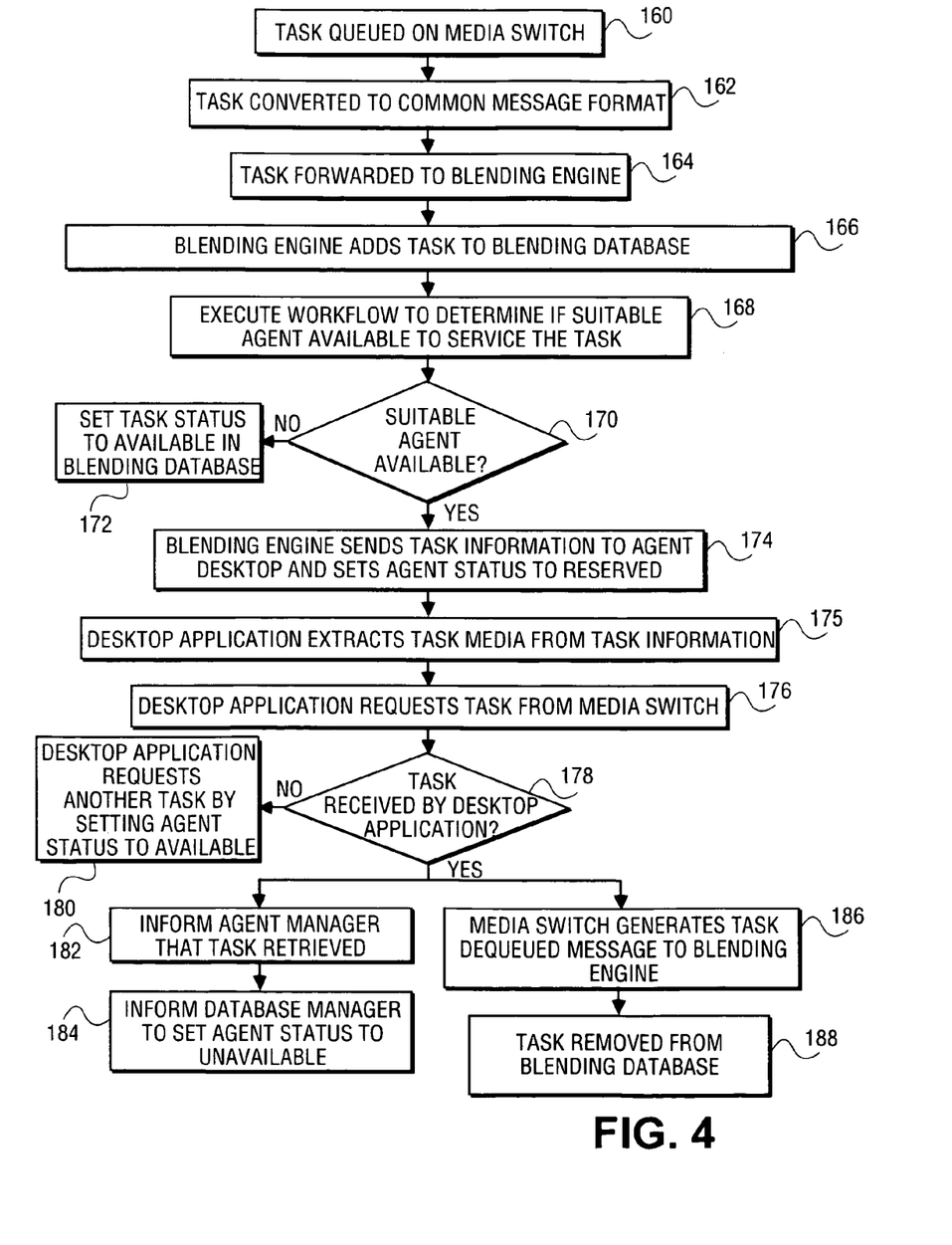
FIG. 4 illustrates a more detailed the flow of actions taken by a blending system upon receiving an incoming task.

FIG. 4 illustrates a more detailed the flow of actions taken by a blending system upon receiving an incoming task. Whenever a task is queued on a media switch, as shown in block 160, the media switch converts the task information into a common message format the blending engine can process, as shown in block 162. The media switch signals the blending engine that a task needs to be processed by forwarding the task, represented as task information in a common message format, to the blending engine, as shown in block 164. In one embodiment, the blending engine maintains a set of queues in the blending database, one for each media switch. In this way, the blending database maintains a snapshot of the workload of the media switches of the contact center. Using this snapshot, combined with agent availability data and agent skill data of the agents, workflows determine the most suitable agent for the task at the particular moment in time. When a task is queued on a media switch, it is added to the blending database with a status of AVAILABLE, as shown in block 166. A workflow is then executed to determine whether a suitable agent is available to service the task, as shown in block 168.

The emphasis in "task queued" workflows is finding agents that are available to handle the task. In one embodiment, if multiple agents are available, the task is routed to the agent that has waited longest since their previous task. In another embodiment, assignment of tasks is based on that agent's relative skill in a particular medium. For example, in such an embodiment, if an email message is to be serviced, the email message is routed to the agent with the highest email-handling skill level. In yet another embodiment, a task is routed based on consideration of the business area to which the contact relates so that the agent with the highest skill in that business area is assigned the task. The criteria and rules for these decisions are dependent on the information available to the workflow. In various embodiments, the blending database maintains pertinent data about each agent that may be important in determining which agent should be assigned a particular task. In these embodiments, the business rules may contemplate the following: the agent's fluency in a language that may be required to service the task is considered, the number of hours the agent has been at work without a break, the agent's expertise in a product area, the agent's proficiency in using particular kinds of media, etc.

In one embodiment, the business rules of workflows may be customizable and exist in multiple varying embodiments. Workflows can be very complex, with decisions being made based on many different sources of information. For example, in one embodiment, workflows interrogate a customer database in addition to the blending database to determine whether the caller is a high-value, VIP customer, or a less important customer, and route the call accordingly. In another example, another embodiment provides for workflows communicating with older systems, known as legacy systems, to obtain information based on the business rules built into the older system. In such an embodiment, the investment already made in building the older business rules is not lost, and the business rules are not duplicated in a newly added component. Any of the workflow server's capabilities can be leveraged in this way to provide highly complex decision-making.

In yet another embodiment, to allow for workflows to be run at high-volumes, one for each task queued, where intricate workflows include complex database queries, slow networking links and large data sets, throughput is increased and latency is reduced by database caching and/or database replication, i.e., redundancy or multiple copies of the same database on multiple computers. In one embodiment, when a task is dequeued or terminated, it is removed from the blending database, but no workflow is invoked. In another embodiment, when a task is dequeued or terminated, an appropriate workflow such as, for example, a "task dequeued" workflow may be executed.

Using the above and other criteria, the workflow determines if a suitable agent is available to service the task, as shown in block 168. The workflow server then advises the blending engine of its decision as to which, if any, suitable agent is available to service the task, as shown in block 170. If a suitable agent is not available, the task remains in the blending database, with status AVAILABLE, as shown in blocks 170 and 172. The task is later assigned either when an agent requests more work, if the media switch assigns the task to a non-blended agent, or if another custom workflow assigns the task, such as when a certain condition (like call volume exceeding a defined threshold) exists. If a suitable agent is available, the blending engine sends the details of that task to the agent's desktop, as shown in blocks 170 and 174. In one embodiment, not shown, the desktop application receives the task information and determines whether the agent accepts the task. In this embodiment, the action in blocks 52, 54, 58 and 46 of FIG. 2 may be executed. In this embodiment, if a suitable agent is available that accepts the task, the desktop application uses information about the task to determine what media switch and/or medium corresponds to the task, as shown in block 175. The relevant API is then used to request the task from the particular media switch, as shown in block 176. While this process is carried out, the agent's blending status is set to RESERVED to signal to other workflows that the agent is not available to be assigned tasks.

There is a possibility that the task being requested may no longer be queued when the desktop application requests it. This may occur, for example, when the media switch assigns the task to a non-blended agent, or, in the case of voice calls, when the caller hangs up. Generally, this scenario is catered for by dequeued/terminated messages being sent by the media switch which causes the blending engine to remove the task from the blending queue. However, the possibility that the sequencing of events may lead to a task being requested when the task is no longer available means that the desktop must be able to handle this scenario. At this point, the desktop application must determine whether the task has been received, as shown in block 178, by, in one embodiment, timing out, or, in another embodiment, processing a task not available notification. If the task an agent was assigned no longer exists, the desktop application requests another task, in one embodiment, by setting the agent status to AVAILABLE as shown in block 180.

If the task is received by the desktop application, as shown in block 178, the desktop application will inform the agent manager via the desktop helper that this has occurred, as shown in block 182. In addition, the agent message handler will instruct the database manager to update the agent's status to UNAVAILABLE, as shown in block 184. The media switch also generates a "task dequeued" message at this point, causing that task to be removed from the blending database, as shown in blocks 186 and 188.

In yet another embodiment, the "task queued" workflow may assign tasks to electronic devices via software agents in addition to human agents. In such an embodiment, automatic email, and/or automatic voice generation or play back may provide information requested by the task. For example, the task may be an email or telephonic request for a current balance or information about the last three transactions or last three checks that cleared. Such information can easily automatically be retrieved and provided via email or text to voice synthesis via telephone. Similarly, driving directions to a facility or store policies may be pre-recorded in text or voice and automatically be sent as email or played back via a telephone.

2. Agent Available Workflow

Figure 5:
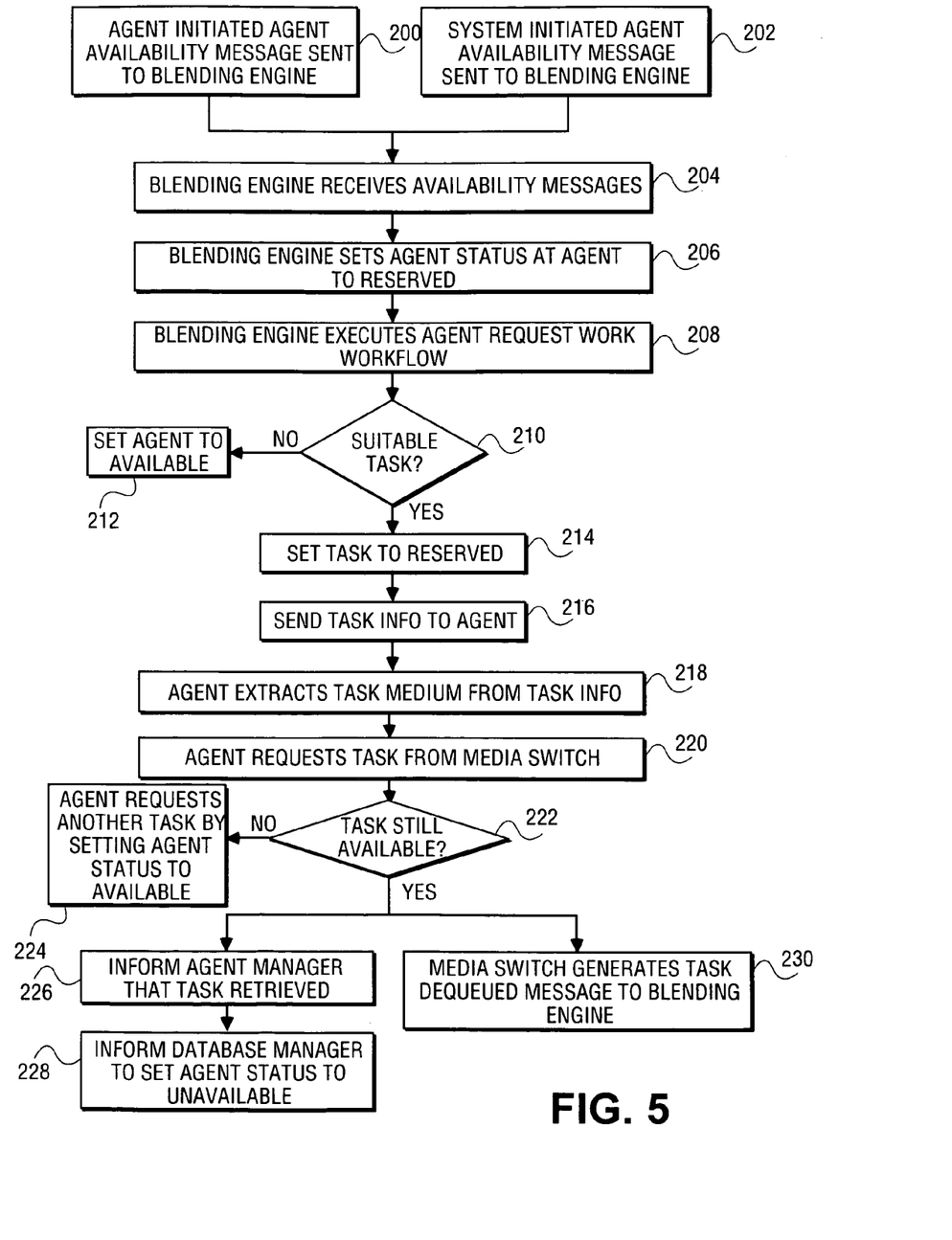
FIG. 5 illustrates the flow of actions taken by a blending system upon an agent becoming available.

FIG. 5 illustrates the flow of actions taken by a blending system upon an agent becoming available. An "agent available" workflow is invoked when an agent finishes handling a task and indicates that the agent is ready for another task. In one embodiment, a notification that an agent is ready for another task is agent-initiated. In this embodiment, the agent presses a button on a desktop application to indicate that the agent is ready for another task, causing a message stating that the agent is available to be sent to the blending engine, as shown in block 200. In another embodiment, a notification that an agent is ready for another task is automatic. In this embodiment, when the agent finishes with a task, the application used to carry out that task recognizes that the task has been completed, and communicates with the blending engine, sending a message that the agent is available to service another task, as shown in block 202. In one embodiment, changing the agent's status from "available if needed" to "available" triggers a communication to the blending engine that the agent is available to service a task.

After receipt of an agent available message, as shown in block 204, the blending engine sends a message to the blending database placing the agent in a state of RESERVED, as shown in block 206, and the blending engine then invokes the agent available workflow by messaging the workflow server, as shown in block 208. The agent is put in a state of RESERVED in order to avoid the situation where a separate "task queued" workflow selects that agent for its task while the workflow is executing attempting to find the agent a new task. The workflow server then proceeds to find a task suitable for the agent by querying the blending database. If no suitable pending task is found, the agent state will be set to AVAILABLE, as shown in blocks 210 and 212.

If a pending task is found for the agent, the blending database entry for the task is marked as RESERVED, as shown in blocks 210 and 214. The blending database entry for the task is marked as RESERVED in order that another "agent available" workflow does not assign the task to another agent. The blending engine then sends information about the task to the agent, as shown in block 216. The desktop application uses the task information received from the blending engine to retrieve the task by extracting the task medium from the task information, as shown in block 218. The agent then requests the task from the corresponding media switch, as shown in block 220. If the task no longer exists, the desktop agent requests another task, as shown in blocks 222 and 224. If the desktop component succeeds in retrieving the task from the media switch, as shown in block 222, the agent manager component of the blending engine is informed that the task has been successfully assigned, as shown in block 226, and the agent message handler informs the database manager to update the agent's status to UNAVAILABLE, as shown in block 228. As discussed above, the removal of the task from the media switch causes a "task dequeued" message to be generated by the media switch and sent to the blending engine, as shown in block 230. This message causes the task to be removed from the blending database.

In another embodiment, when an agent requests more work, the agent may request that a particular medium be excluded. This embodiment is referred to as the empowered agent embodiment. For example, in this embodiment, an the agent may set certain parameters specify that, despite call levels being high, the agent will not accept any calls, preferring to deal with email messages exclusively.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   receiving task data indicating a plurality of tasks, each task comprising a customer contact, and agent data indicating a plurality of agents;
   storing the task data and the agent data in a database system; and
   assigning respective tasks of the plurality of tasks to at least one of the agents according to workflows after unsuccessfully attempting to assign the respective tasks to respective non-blended agents via respective media specific media switches, wherein the receiving of the agent data includes receiving status messages from the plurality of agents, each status message providing agent availability data;
   determining a system overloaded condition and
   reassigning a first agent from a first task currently being handled by the first agent by interrupting the first agent and instructing the first agent to abandon the task currently being handled and switching the first agent to a second task responsive to the determining the system overloaded condition.

2. The method of claim 1 wherein the receiving comprises:
   receiving the task data from a plurality of sources and reassigning comprises instructing the first agent to abandon handling emails and switch to handling telephone calls.

3. The method of claim 2 wherein the plurality of sources comprise heterogeneous media switches.

4. The method of claim 3 wherein each of the heterogeneous media switches is from a group consisting of electronic mail systems, internet live text systems, internet voice transmission systems, telephonic voice systems, telephonic facsimile systems, and voice mail systems.

5. The method of claim 1, wherein the status messages designate either busy or available.

6. The method of claim 1 wherein the agent availability data comprises anyone of the group including whether the agent is busy, is available, accepts a first type of task, declines a second type of task, and accepts a task responsive to the system overloaded condition.

7. The method of claim 6 wherein the system overloaded condition is workflow defined and wherein reassigning comprises interrupting the first agent requesting that the first agent abandon the first task currently being handled by the first agent and take up handling the second task.

8. The method of claim 1 wherein the database system comprises:
   at least one volatile memory database and at least one writable medium database which are synchronized with each other.

9. The method of claim 8 wherein status of at least one agent is changed to available from one of unavailable and available-if-needed in response to system load exceeding a predetermined system load threshold.

10. The method of claim 1 wherein the assigning comprises:
    executing a task queued work flow responsive to receiving the task data; and
    executing an agent availability workflow responsive to receiving the agent data.

11. The method of claim 10 wherein the executing of the task queued work flow comprises:
    storing the task data as a task entry in the database system;
    identifying the first agent of the plurality of agents to handle the first task of the plurality of tasks; and
    assigning the first agent the first task.

12. The method of claim 10 wherein the executing of the agent availability workflow comprises:
    storing the agent data as an agent entry in the database system;
    identifying the first task of the plurality of tasks to be handled by the first agent of the plurality of agents; and
    assigning the first task to the first agent.

13. The method of claim 11 wherein the identifying comprises:
    searching the database system for an agent entry meeting defined criteria.

14. The method of claim 13 wherein the assigning comprises:
    notifying the first agent to handle the first task; and
    receiving a response from the first agent either accepting or declining the first task; and
    if the first agent accepts the first task, updating the database system.

15. The method of claim 13 wherein the defined criteria includes any one of the group including elapsed time since a previous task was performed, a skill level in a business area, a skill level in a product area, a proficiency in a media, a fluency in a language, elapsed time since beginning work, elapsed time since taking a break.

16. The method of claim 14 wherein the updating of the database system comprises:
    modifying the task entry and the agent entry.

17. The method of claim 12 wherein the identifying comprises;
    searching the database system for a task entry meeting defined criteria.

18. The method of claim 17 wherein the assigning comprises:
    notifying the first agent to handle the first task; and
    receiving a response from the first agent either accepting or declining the first task; and
    if the first agent accepts the first task, updating the database system.

19. The method of claim 18 wherein the updating the database system comprises;
    modifying the task entry and the agent entry.

20. The method claim 1 wherein the reassigning comprises:

requesting the first agent to abandon the first task for the second task;
receiving a response from the first agent either accepting or declining the second task; and
if the first agent accepts the second task, assigning the second task to the first agent.

21. The method claim 1 wherein the reassigning comprises;
instructing the first agent to abandon the first task for the second task; and
assigning the second task to the first agent.

22. The method claim 21 wherein the first task is responding to a received email and the second task is processing a current call.

23. The method of claim 1 wherein the determining the system overloaded condition includes determining whether the volume of tasks has exceeded a predetermined level.

24. A system comprising:
a blending engine coupled to a plurality of media switches each media switch being media specific such that the blending engine receives task data from the plurality of media switches sent to the blending engine by each respective media switch in response to the respective media switch unsuccessfully attempting to assign the task to a blended agent;
a plurality of agent workstations coupled to the blending engine such that the agent workstation provide agent data to the blending engine, and the blending engine provides a plurality of task assignments to the agent workstations;
a blending database coupled to the blending engine such that the blending engine and the blending database exchange the agent data and the task data; and
a workflow manager coupled to the blending database and the blending engine such that the workflow manager:
accesses the blending database,
executes workflows,
communicates the plurality of task assignments to the blending engine, wherein the blending engine receives status messages from the plurality of agents, each status message providing agent availability data;
determines a system overloaded condition, and
reassigns a first agent from a first task to a second task responsive to the system overloaded condition.

25. The system of claim 24 wherein each media switch comprises:
an adapter coupled to a media specific queue; and
each media specific queue is coupled to the blending engine.

26. The system of claim 24 wherein each media switch provides at least one connection to one of a group comprising:
an electronic mail system, an internet live text system, an internet voice transmission system, a telephonic voice system, a telephonic facsimile system, and a voice mail system.

27. The system of claim 24 wherein each agent workstation comprises:
a desktop helper; and
each desktop helper is coupled to the blending engine via a blending engine queue.

28. The system of claim 24 wherein the blending database comprises at least one volatile memory database synchronized with at least one writable medium database.

29. The system of claim 28 wherein the blending database stores a plurality of task entries and a plurality of agent entries.

30. The system of claim 29 wherein the volatile memory database is a superset of the writable medium database.

31. The system of claim 29 wherein the volatile memory database stores a blending engine queue data and a plurality of media specific queue data.

32. The system of claim 29, wherein to accesses the blending database comprises:
reading the task entries and the agent entries.

33. A machine readable medium having stored thereon instructions which when executed by a processor cause the machine to perform operations comprising:
receiving task data indicating a plurality of tasks, each task comprising a customer contact, and agent data indicating a plurality of agents;
storing the task data and the agent data in a database system;
assigning respective tasks of the plurality of tasks to at least one of the agents according to workflows after unsuccessfully attempting to assign the respective tasks to respective non-blended agents via media specific switches;
determining a system overloaded condition; and
reassigning a first agent from a first task currently being handled by the first agent by interrupting the first agent and instructing the first agent to abandon the task currently being handled and switching the first agent to a second task responsive to the determining the system overloaded condition, the receiving of the agent data including receiving status messages from the plurality of agents, each status message provides agent availability data.

34. The machine readable medium of claim 33 wherein the receiving of the task data comprises:
receiving the task data from a plurality of sources.

35. The machine readable medium of claim 34 wherein the plurality of sources comprise heterogeneous media switches.

36. The machine readable medium of claim 35 wherein each of the heterogeneous media switches is from a group consisting of electronic mail systems, internet live text systems, internet voice transmission systems, telephonic voice systems, telephonic facsimile systems, and voice mail systems.

37. The machine readable medium of claim 33 wherein the reassigning comprises interrupting performance of the first task by the first agent and switching the first agent to performing the second task.

38. The machine readable medium of claim 33 wherein the agent availability data comprises any one of the group including whether the agent is busy, available, accepts a first type of task, declines a second type of task, and accepts a task responsive to a system overloaded condition.

39. The machine readable medium of claim 38 wherein the system overloaded condition is workflow defined.

40. The machine readable medium of claim 33 wherein the database system comprises:
at least one volatile memory database and at least one writable medium database.

41. The machine readable medium of claim 40 wherein the volatile memory database and the writable medium database are synchronized.

42. The machine readable medium of claim 41 wherein the assigning comprises:
executing a task queued work flow responsive to receiving the task data; and
executing an agent availability workflow responsive to receiving the agent data.

43. The machine readable medium of claim 42 wherein the executing a task queued work flow comprises;
   storing the task data as a task entry in the database system;
   identifying the first agent of the agents to handle the first task of the plurality of task; and
   assigning the first agent the first task.

44. The machine readable medium of claim 42 wherein the executing an agent availability workflow comprises:
   storing the agent data as an agent entry in the database system;
   identifying the first task of the plurality of tasks to be handled by the first agent of the plurality of agents; and
   assigning the first task to the first agent.

45. The machine readable medium of claim 43 wherein the identifying comprises:
   searching the database system for an agent entry meeting defined criteria.

46. The machine readable medium of claim 45 wherein the assigning comprises:
   notifying the first agent to handle the first task; and
   receiving a response from the first agent either accepting or declining the first task; and
   if the first agent accepts the first task, updating the database system.

47. The machine readable medium of claim 46 wherein the updating the database system comprises:
   modifying the task entry and the agent entry.

48. The machine readable medium of claim 44 wherein the identifying comprises;
   searching the database system for a task entry meeting defined criteria.

49. The machine readable medium of claim 48 wherein the assigning comprises:
   notifying the first agent to handle the first task; and
   receiving a response from the first agent either accepting or declining the first task; and
   if the first agent accepts the first task, updating the database system.

50. The machine readable medium of claim 49 wherein the updating the database system comprises:
   modifying the task entry and the agent entry.

* * * * *